US012300138B2

(12) United States Patent
Liu

(10) Patent No.: US 12,300,138 B2
(45) Date of Patent: May 13, 2025

(54) DRIVE CIRCUIT AND DISPLAY APPARATUS

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,264

(22) PCT Filed: Sep. 14, 2021

(86) PCT No.: PCT/CN2021/118125
§ 371 (c)(1),
(2) Date: Sep. 3, 2023

(87) PCT Pub. No.: WO2023/029083
PCT Pub. Date: Mar. 9, 2023

(65) Prior Publication Data

US 2024/0021120 A1 Jan. 18, 2024

(30) Foreign Application Priority Data

Sep. 3, 2021 (CN) ........................ 202111032553.1

(51) Int. Cl.
*G09G 3/20* (2006.01)

(52) U.S. Cl.
CPC ....... *G09G 3/20* (2013.01); *G09G 2300/0847* (2013.01); *G09G 2310/0291* (2013.01); *G09G 2330/06* (2013.01)

(58) Field of Classification Search
CPC ............. G09G 3/20; G09G 2300/0847; G09G 2310/0291; G09G 2330/06; G09G 2300/042
See application file for complete search history.

(56) References Cited

U.S. PATENT DOCUMENTS

2002/0116433 A1* 8/2002 Awaka .................. G06F 7/5332 708/603
2003/0122736 A1* 7/2003 Kang .................. G09G 3/2944 345/60

(Continued)

FOREIGN PATENT DOCUMENTS

CN 101145331 3/2008
CN 102013229 4/2011

(Continued)

OTHER PUBLICATIONS

International Search Report and the Written Opinion Dated Jun. 25, 2022 From the International Searching Authority Re. Application No. PCT/CN2021/118125 and Its Translation Into English. (15 Pages).

*Primary Examiner* — Dmitriy Bolotin

(57) ABSTRACT

A drive circuit disclosed by the present application includes: a first terminal; a plurality of second terminals; a first circuit module electrically connected to the first terminal and the plurality of second terminals, where the first circuit module is configured to reduce alternating current power generated when a drive signal accessed by the first terminal is transmitted to the plurality of second terminals; and a plurality of second circuit modules, where the plurality of second circuit modules are one-to-one electrically connected to the plurality of second terminals, and the second circuit modules each are configured to output a data signal based on the drive signal.

16 Claims, 4 Drawing Sheets

(56) References Cited

U.S. PATENT DOCUMENTS

| | | | | |
|---|---|---|---|---|
| 2005/0088397 | A1* | 4/2005 | Yu | G09G 3/3688 345/100 |
| 2006/0077738 | A1* | 4/2006 | Kwon | G09G 3/3283 365/203 |
| 2006/0244689 | A1* | 11/2006 | Osame | G09G 3/3258 345/76 |
| 2007/0152921 | A1* | 7/2007 | Osame | G09G 3/3258 345/76 |
| 2007/0159417 | A1* | 7/2007 | Miyake | G09G 3/3258 345/76 |
| 2008/0042689 | A1* | 2/2008 | Yen | G09G 3/3688 326/82 |
| 2010/0194731 | A1* | 8/2010 | Hiratsuka | G09G 3/3688 327/269 |
| 2010/0245325 | A1* | 9/2010 | Xiao | G09G 3/3688 345/211 |
| 2013/0009918 | A1* | 1/2013 | Yang | G09G 3/3614 345/204 |
| 2014/0097802 | A1* | 4/2014 | Tang | G09G 3/3696 320/166 |
| 2016/0093245 | A1* | 3/2016 | Watanabe | G09G 3/3688 345/212 |
| 2016/0125783 | A1* | 5/2016 | Huang | G09G 3/2003 345/694 |
| 2018/0336860 | A1* | 11/2018 | Xing | G09G 3/3688 |
| 2020/0286418 | A1* | 9/2020 | Lee | G09G 3/3677 |
| 2023/0010045 | A1* | 1/2023 | Tsuchi | G09G 3/3685 |

FOREIGN PATENT DOCUMENTS

| | | |
|---|---|---|
| CN | 107016977 | 8/2017 |
| CN | 107608150 | 1/2018 |
| CN | 109509420 | 3/2019 |
| CN | 209249057 | 8/2019 |
| CN | 111145685 | 5/2020 |
| CN | 112542122 | 3/2021 |
| JP | 2006-133795 | 5/2006 |

* cited by examiner

DRIVE CIRCUIT AND DISPLAY APPARATUS

RELATED APPLICATIONS

This application is a National Phase of PCT Patent Application No. PCT/CN2021/118125 having International filing date of Sep. 14, 2021, which claims the benefit of priority under 35 USC § 119 (e) of U.S. Provisional Patent Application No. filed on. The contents of the above applications are all incorporated by reference as if fully set forth herein in their entirety.

FIELD AND BACKGROUND OF THE INVENTION

The present application relates to display technologies, and more particularly, to a drive circuit and a display apparatus.

With the development of a high resolution and high refresh rate in the display industry, a transmission protocol with a higher rate is required, and a drive signal with a high rate generates greater alternating current power during transmission, causing serious electromagnetic interference problems in a driver chip.

SUMMARY OF THE INVENTION

The present application provides a drive circuit and a display apparatus, which can reduce alternating current power generated during transmission of a drive signal, thereby reducing a radiation intensity of an electromagnetic field.

According to a first aspect, the present application provides a drive circuit, including:

a first terminal;

a plurality of second terminals;

a first circuit module electrically connected to the first terminal and the plurality of second terminals, where the first circuit module is configured to reduce alternating current power generated when a drive signal accessed by the first terminal is transmitted to the plurality of second terminals; and a plurality of second circuit modules, where the plurality of second circuit modules are one-to-one electrically connected to the plurality of second terminals, and the second circuit modules each are configured to output a data signal based on the drive signal.

In the drive circuit according to the present application, the first circuit module includes a plurality of circuit units, the circuit units each are configured to increase a drive current to enhance a driving capability of the drive signal, and the plurality of circuit units are arranged in series to form a series branch, where the series branch has a first end and a plurality of second ends, the first end and the plurality of second ends are arranged in sequence, the first end is electrically connected to the first terminal, and the plurality of second ends are one-to-one electrically connected to the plurality of second terminals.

In the drive circuit according to the present application, the circuit units each include an operational amplifier, the operational amplifier has a positive terminal, a negative terminal and an output terminal, the positive terminal is an input terminal of the circuit unit, and the negative terminal is electrically connected to the output terminal.

In the drive circuit according to the present application, on the series branch, the number of the circuit units arranged between two adjacent second ends is equal.

In the drive circuit according to the present application, on the series branch, one circuit unit is arranged between two adjacent second ends.

In the drive circuit according to the present application, on the series branch, the number of the circuit units arranged between two adjacent second ends increases in a direction from the first end to the plurality of second ends.

In the drive circuit according to the present application, on the series branch, one circuit unit is further arranged between the first end and the first terminal.

In the drive circuit according to the present application, power $P_n$ is generated when the drive signal accessed by the first terminal is transmitted to the $n^{th}$ second terminal, $P_n=f_n*C_n*V^2$, where $C_n$ is a parasitic capacitance corresponding to the $n^{th}$ second terminal, and $f_n$ is a charging and discharging frequency of the parasitic capacitance corresponding to the first second terminal to the parasitic capacitance corresponding to the $n^{th}$ second terminal; and V is a voltage value of the drive signal.

In the drive circuit according to the present application, the drive signal is a clock signal, an output enable control signal, or a data voltage signal.

According to a second aspect, the present application further provides a display apparatus, including a display panel and a driver chip electrically connected to the display panel, where the driver chip includes a drive circuit, and the drive circuit includes:

a first terminal;

a plurality of second terminals;

a first circuit module electrically connected to the first terminal and the plurality of second terminals, where the first circuit module is configured to reduce alternating current power generated when a drive signal accessed by the first terminal is transmitted to the plurality of second terminals; and a plurality of second circuit modules, where the plurality of second circuit modules are one-to-one electrically connected to the plurality of second terminals, and the second circuit modules each are configured to output a data signal based on the drive signal.

In the display apparatus according to the present application, the first circuit module includes a plurality of circuit units, the circuit units each are configured to increase a drive current to enhance a driving capability of the drive signal, and the plurality of circuit units are arranged in series to form a series branch, where the series branch has a first end and a plurality of second ends, the first end and the plurality of second ends are arranged in sequence, the first end is electrically connected to the first terminal, and the plurality of second ends are one-to-one electrically connected to the plurality of second terminals.

In the display apparatus according to the present application, the circuit units each include an operational amplifier, the operational amplifier has a positive terminal, a negative terminal and an output terminal, the positive terminal is an input terminal of the circuit unit, and the negative terminal is electrically connected to the output terminal.

In the display apparatus according to the present application, on the series branch, the number of the circuit units arranged between two adjacent second ends is equal.

In the display apparatus according to the present application, on the series branch, one circuit unit is arranged between two adjacent second ends.

In the display apparatus according to the present application, on the series branch, the number of the circuit units arranged between two adjacent second ends increases in a direction from the first end to the plurality of second ends.

In the display apparatus according to the present application, on the series branch, one circuit unit is further arranged between the first end and the first terminal.

In the display apparatus according to the present application, power $P_n$ is generated when the drive signal accessed by the first terminal is transmitted to the $n^{th}$ second terminal, $P_n=f_n*C_n*V^2$, where $C_n$ is a parasitic capacitance corresponding to the $n^{th}$ second terminal, and $f_n$ is a charging and discharging frequency of the parasitic capacitance corresponding to the first second terminal to the parasitic capacitance corresponding to the $n^{th}$ second terminal; and V is a voltage value of the drive signal.

In the display apparatus according to the present application, the drive signal is a clock signal, an output enable control signal, or a data voltage signal.

In the drive circuit and the display apparatus according to the present application, a first circuit module is arranged in a chip, and the first circuit module is electrically connected to a first terminal and a plurality of second terminals, which can reduce alternating current power generated during transmission of a drive signal, thereby reducing a radiation intensity of an electromagnetic field.

BRIEF DESCRIPTION OF THE SEVERAL VIEWS OF THE DRAWINGS

To explain the technical solutions of the embodiments of the present application more clearly, the following briefly describes the accompanying drawings required in the description of the embodiments. Apparently, the accompanying drawings in the following description show only some embodiments of the present application, and a person skilled in the art may still derive other accompanying drawings from the accompanying drawings without creative efforts.

BRIEF DESCRIPTION OF SPECIFIC EMBODIMENTS OF THE INVENTION

The technical solutions in the embodiments of the present application are clearly and completely described below with reference to the accompanying drawings in the embodiments of the present application. Apparently, the described embodiments are merely some rather than all of the embodiments of the present application. Based on the embodiments of the present application, all other embodiments obtained by a person skilled in the art without creative efforts shall fall within the protection scope of the present application. It should be understood that the specific implementations described herein are only used to illustrate and explain the present application, and are not used to limit the present application. The terms "first", "second", etc. in the claims and the specification of the present application are used to distinguish between different objects, rather than to describe a specific order.

Figure 1:
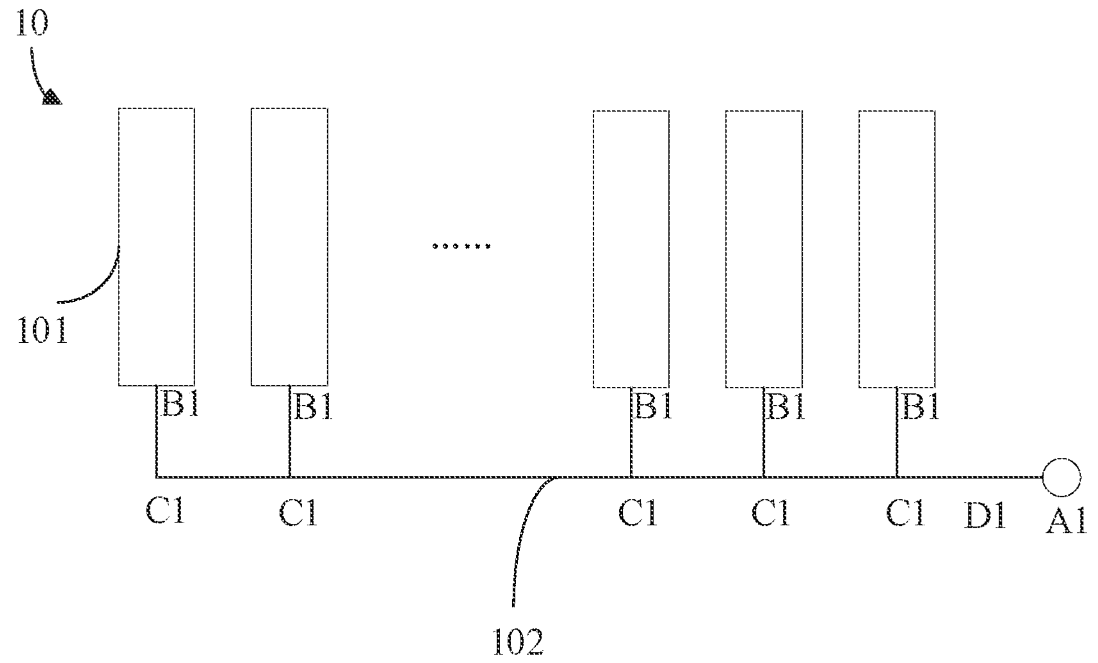
FIG. 1 is a schematic structural diagram of a drive circuit according to an embodiment of the present application.

Referring to FIG. 1, FIG. 1 is a schematic structural diagram of a drive circuit according to an embodiment of the present application. As shown in FIG. 1, the drive circuit 10 shown in FIG. 1 includes a first terminal A1, a plurality of second terminals B1 and a plurality of second circuit modules 101. The plurality of second circuit modules 101 are one-to-one electrically connected to the plurality of second terminals B1. The plurality of second terminals B1 are electrically connected to the first terminal A1 through a signal line 102. The second circuit modules 101 each are configured to output a data signal based on a drive signal accessed by the first terminal A1. The data signal is provided to a display panel, so that the display panel displays an image.

The signal line 102 has a first signal terminal D1 and a plurality of second signal terminals C1. The first signal terminal D1 is electrically connected to the first terminal A1. The plurality of second signal terminals C1 are one-to-one electrically connected to the plurality of second terminals B1. That is, after being accessed by the first terminal A1, the drive signal sequentially passes through the first signal terminal D1 and the plurality of second signal terminals C1.

It can be understood that the drive signal accessed by the first terminal A1 is output to the plurality of second circuit modules 101 through the first signal terminal D1, the plurality of second signal terminals C1 and the plurality of second terminals B1. Due to the parasitic capacitance on the signal line 102, the drive signal accessed by the first terminal A1 generates an electric field when passing through the parasitic capacitance, the time-varying electric field generates a time-varying magnetic field, and the drive signal generates large alternating current power during transmission, resulting in serious electromagnetic interference in a driver chip.

Based on this, the present application further provides another drive circuit. The drive circuit according to the embodiment of the present application can reduce alternating current power generated during transmission of a drive signal, thereby reducing a radiation intensity of an electromagnetic field. The drive circuit may be integrated in a driver chip. The driver chip may be a source driver chip of a display apparatus.

Figure 2:
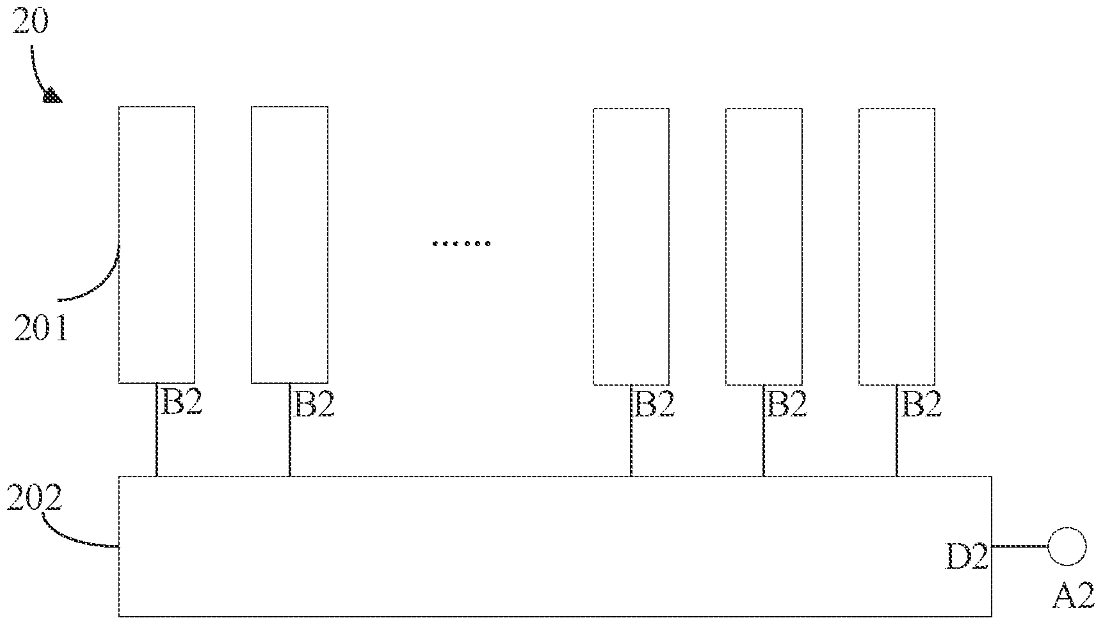
FIG. 2 is another schematic structural diagram of a drive circuit according to an embodiment of the present application.

Referring to FIG. 2, FIG. 2 is another schematic structural diagram of a drive circuit according to an embodiment of the present application. The drive circuit 20 shown in FIG. 2 differs from the drive circuit 10 shown in FIG. 1 in that the drive circuit 20 shown in FIG. 2 is provided with a first circuit module 202. The drive circuit 202 shown in FIG. 2 includes a first terminal A2, a plurality of second terminals B2, the first circuit module 202 and a plurality of second circuit modules 201. The first circuit module 202 is electrically connected to the first terminal A2 and the plurality of second terminals B2. The plurality of second circuit modules 201 are one-to-one electrically connected to the plurality of second terminals B2. The second circuit modules 201 each are configured to output a data signal based on a drive signal. The first circuit module 202 is configured to reduce alternating current power generated when a drive signal accessed by the first terminal A2 is transmitted to the plurality of second terminals B2.

The drive signal may be a signal output by other modules in a driver chip. For example, in a data driver chip, the drive signal may be a clock signal, an output enable control signal, or a data voltage signal.

Figure 3:
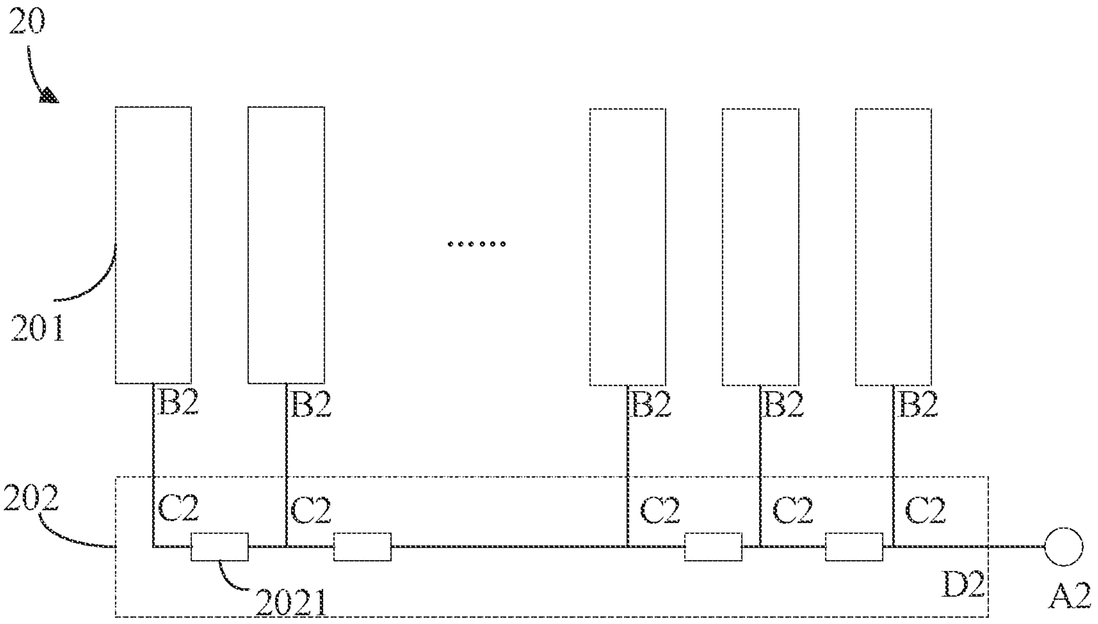
FIG. 3 is a schematic structural diagram of a first circuit module in the drive circuit shown in FIG. 2.

Specifically, referring to FIG. 3, FIG. 3 is a schematic structural diagram of a first circuit module in the drive circuit shown in FIG. 2. As shown in FIG. 2 and FIG. 3, in the drive circuit 20 according to the embodiment of the present application, the first circuit module 202 includes a plurality of circuit units 2021. The circuit units 2021 each are configured to increase a drive current to enhance a driving capability of the drive signal. The plurality of circuit units 2021 are arranged in series to form a series branch. The series branch has a first end D2 and a plurality of second ends C2. The first end D2 and the second ends C2 are arranged in sequence. The first end D2 is electrically connected to a first terminal A2. The plurality of second ends C2 are one-to-one electrically connected to a plurality of second terminals B2. That is, after being accessed by the first terminal A2, the drive signal sequentially passes through the first end D2 and the plurality of second ends C2.

On the series branch, the number of the circuit units 2021 arranged between two adjacent second ends C2 is equal. In the embodiment of the present application, on the series branch, one circuit unit 2021 is arranged between two adjacent second ends C2. It should be noted that, on the series branch, a plurality of circuit units 2021 may also be arranged between two adjacent second ends C2. That is, on the series branch, two circuit units 2021, three circuit units 2021 or four circuit units 2021 may be arranged between two adjacent second ends C2. On the series branch, the number of the circuit units 2021 arranged between two adjacent second ends C2 may be set based on an actual situation.

Figure 4:
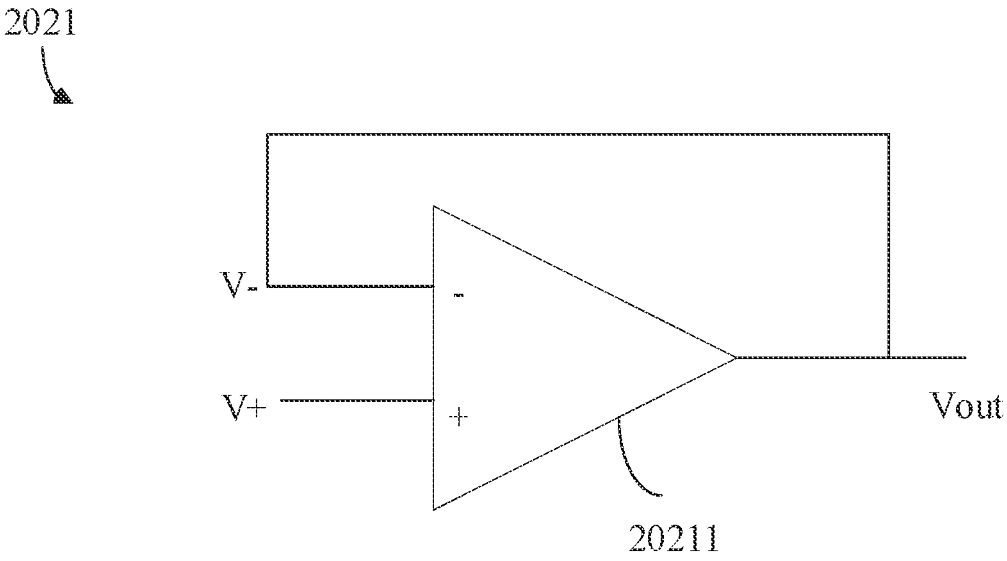
FIG. 4 is a schematic structural diagram of a circuit unit in the first circuit module shown in FIG. 3.

Referring to FIG. 4, FIG. 4 is a schematic structural diagram of a circuit unit in the first circuit module shown in FIG. 3. As shown in FIG. 3 and FIG. 4, in the drive circuit according to the embodiment of the present application, the circuit units 2021 each include an operational amplifier 20211. The operational amplifier 20211 has a positive terminal $V_+$, a negative terminal $V_-$ and an output terminal $V_{out}$. The positive terminal $V_+$ is an input terminal of the circuit unit. The negative terminal $V_-$ is electrically connected to the output terminal $V_{out}$.

For example, the first circuit unit to the $m^{th}$ circuit unit are arranged in sequence. The first circuit unit is a circuit unit close to the first terminal, and the $m^{th}$ circuit unit is a circuit unit away from the first terminal. The first circuit unit includes a first operational amplifier. The first operational amplifier has a first positive terminal, a first negative terminal and a first output terminal. The second circuit unit includes a second operational amplifier. The second operational amplifier has a second positive terminal, a second negative terminal and a second output terminal. The third circuit unit includes a third operational amplifier. The third operational amplifier has a third positive terminal, a third negative terminal and a third output terminal. By analogy, the $m^{th}$ circuit unit includes an $m^{th}$ operational amplifier. The $m^{th}$ operational amplifier has an $m^{th}$ positive terminal, an $m^{th}$ negative terminal and an $m^{th}$ output terminal. The first negative terminal is electrically connected to the first output terminal, the second negative terminal is electrically connected to the second output terminal, and the third negative terminal is electrically connected to the third output terminal. By analogy, the $m^{th}$ negative terminal is electrically connected to the $m^{th}$ output terminal. The first positive terminal is electrically connected to the first end. The first output terminal is electrically connected to the second positive terminal, and the second output terminal is electrically connected to the third positive terminal. By analogy, the $(m-1)^{th}$ output terminal is electrically connected to the $m^{th}$ positive terminal.

As shown in FIG. 2, FIG. 3 and FIG. 4, power $P_n$ is generated when the drive signal accessed by the first terminal A2 is transmitted to the $n^{th}$ second terminal B2, $P_n=f_n*C_n*V^2$, where $C_n$ is a parasitic capacitance corresponding to the $n^{th}$ second terminal B2, and $f_n$ is a charging and discharging frequency of the parasitic capacitance corresponding to the first second terminal B2 to the parasitic capacitance corresponding to the $n^{th}$ second terminal B2; and V is a voltage value of the drive signal. That is, in the drive circuit shown in FIG. 2, FIG. 3 and FIG. 4, total power $P_{total}$ is generated when the drive signal accessed by the first terminal A2 is transmitted to the plurality of second terminals B2, and $P_{11}=f_1*C_1*V^2+f_1*C_2*V^2+ \ldots +f_n*C_n*V^2$.

In the drive circuit shown in FIG. 1, power $Q_n$ is generated when the drive signal accessed by the first terminal A1 is transmitted to the $n^{th}$ second terminal B1, $Q_n=f*C_n*V^2$, where $C_n$ is a parasitic capacitance corresponding to the $n^{th}$ second terminal B1, and f is a charging and discharging frequency of the parasitic capacitance corresponding to the first second terminal B1 to the parasitic capacitance corresponding to the $n^{th}$ second terminal B1; and V is a voltage value of the drive signal. That is, in the drive circuit shown in FIG. 1, total power $Q_{total}$ is generated when the drive signal accessed by the first terminal A1 is transmitted to the plurality of second terminals B1, and $Q_{total}=f*C_1*V^2+f*C_1*V^2+ \ldots +f*C_n*V^2$, where f is a charging and discharging frequency of the parasitic capacitance corresponding to the first second terminal B1 to the parasitic capacitance corresponding to the $n^{th}$ second terminal B1.

That is, power $P_1$ generated when the drive signal accessed by the first terminal A2 is transmitted to the first second terminal B2 in the drive circuit 20 shown in FIG. 2, FIG. 3 and FIG. 4 is less than power $Q_1$ generated when the drive signal accessed by the first terminal A1 is transmitted to the first second terminal B1 in the drive circuit 10 shown in FIG. 1; power $P_2$ generated when the drive signal accessed by the first terminal A2 is transmitted to the second terminal B2 in the drive circuit 20 shown in FIG. 2, FIG. 3 and FIG. 4 is less than power $Q_2$ generated when the drive signal accessed by the first terminal A1 is transmitted to the second terminal B1 in the drive circuit 10 shown in FIG. 1; and by analog, power $P_{n-1}$ generated when the drive signal accessed by the first terminal A2 is transmitted to the $(n-1)^{th}$ second terminal B2 in the drive circuit 20 shown in FIG. 2, FIG. 3 and FIG. 4 is less than power $Q_{n-1}$ generated when the drive signal accessed by the first terminal A1 is transmitted to the $(n-1)^{th}$ second terminal B1 in the drive circuit 10 shown in FIG. 1. Power $P_n$ generated when the drive signal accessed by the first terminal A2 is transmitted to the $n^{th}$ second terminal B2 in the drive circuit 20 shown in FIG. 2, FIG. 3 and FIG. 4 is equal to power $Q_n$ generated when the drive signal accessed by the first terminal A1 is transmitted to the $n^{th}$ second terminal B1 in the drive circuit 10 shown in FIG. 1. Therefore, total power $P_{total}$ generated when the drive signal accessed by the first terminal A2 is transmitted to a plurality of second terminals B2 in the drive circuit 20 shown in FIG. 2, FIG. 3 and FIG. 4 is less than power $Q_{total}$ generated when the drive signal accessed by the first terminal A1 is transmitted to a plurality of second terminals B1 in the drive circuit 10 shown in FIG. 1.

It can be understood that compared with the drive circuit 10 shown in FIG. 1, the drive circuit 20 shown in FIG. 2, FIG. 3 and FIG. 4 can reduce alternating current power generated during transmission of the drive signal by arranging the first circuit module 202 in a chip and electrically connecting the first circuit module 202 to the first terminal A2 and the plurality of second terminals B2, thereby reducing a radiation intensity of an electromagnetic field.

Figure 5:
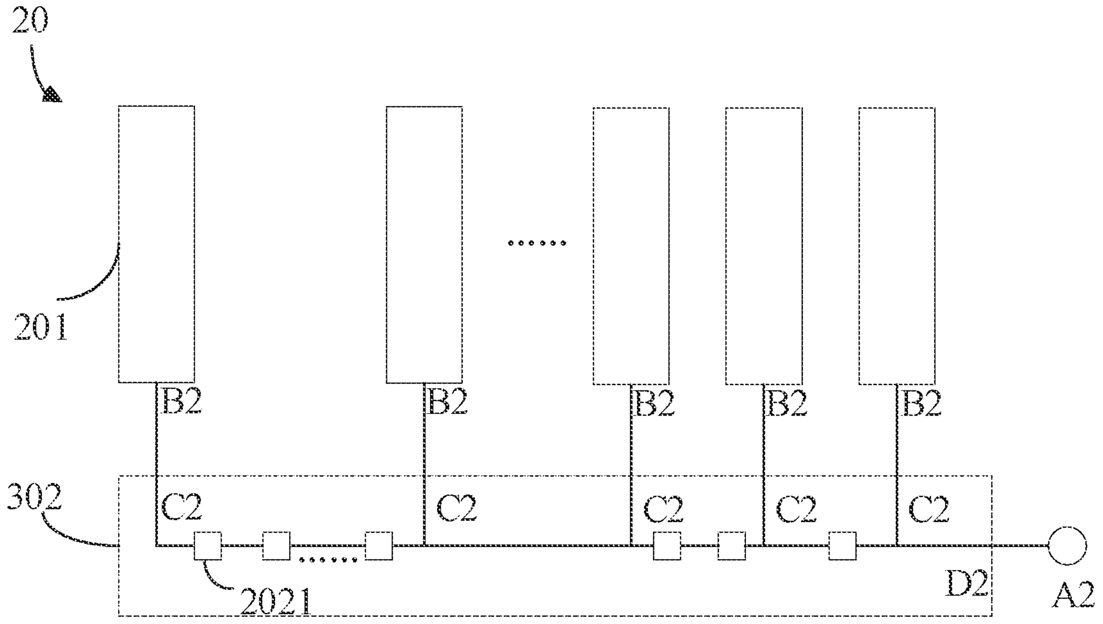
FIG. 5 is another schematic structural diagram of a first circuit module in the drive circuit shown in FIG. 2.

Referring to FIG. 5, FIG. 5 is another schematic structural diagram of a first circuit module in the drive circuit shown in FIG. 2. The first circuit module 302 shown in FIG. 5 differs from the first circuit module 202 shown in FIG. 3 in that in the first circuit module 302 shown in FIG. 5, on a series branch, the number of circuit units 2021 arranged between two adjacent second ends C2 increases in a direction from a first end D2 to a plurality of second ends C2.

As shown in FIG. 2 and FIG. 5, in the drive circuit 20 according to the embodiment of the present application, the first circuit module 302 includes a plurality of circuit units 2021. The circuit units 2021 each are configured to increase a drive current to enhance a driving capability of the drive signal. The plurality of circuit units 2021 are arranged in series to form a series branch. The series branch has a first end D2 and a plurality of second ends C2. The first end D2 and the second ends C2 are arranged in sequence. The first end D2 is electrically connected to a first terminal A2. The plurality of second ends C2 are one-to-one electrically connected to a plurality of second terminals B2. That is, after being accessed by the first terminal A2, the drive signal sequentially passes through the first end D2 and the plurality of second ends C2.

On the series branch, the number of the circuit units 2021 arranged between two adjacent second ends C2 increases in a direction from the first end D2 to the plurality of second ends C2. In the embodiment of the present application, one circuit unit 2021 is arranged between first two adjacent second ends C2, two circuit units 2021 are arranged between second two adjacent second ends C2, and by analogy, s circuit units 2021 are arranged between $s^{th}$ two adjacent second ends C2. It should be noted that compared with the number of the circuit units 2021 arranged between the first two adjacent second ends C2, the number of the circuit units 2021 arranged between the second two adjacent second ends C2 may be increased by one circuit unit 2021, two circuit units 2021, three circuit units 2021 or four circuit units 2021. The number of the circuit units 2021 increased may be set based on an actual situation.

Figure 6:
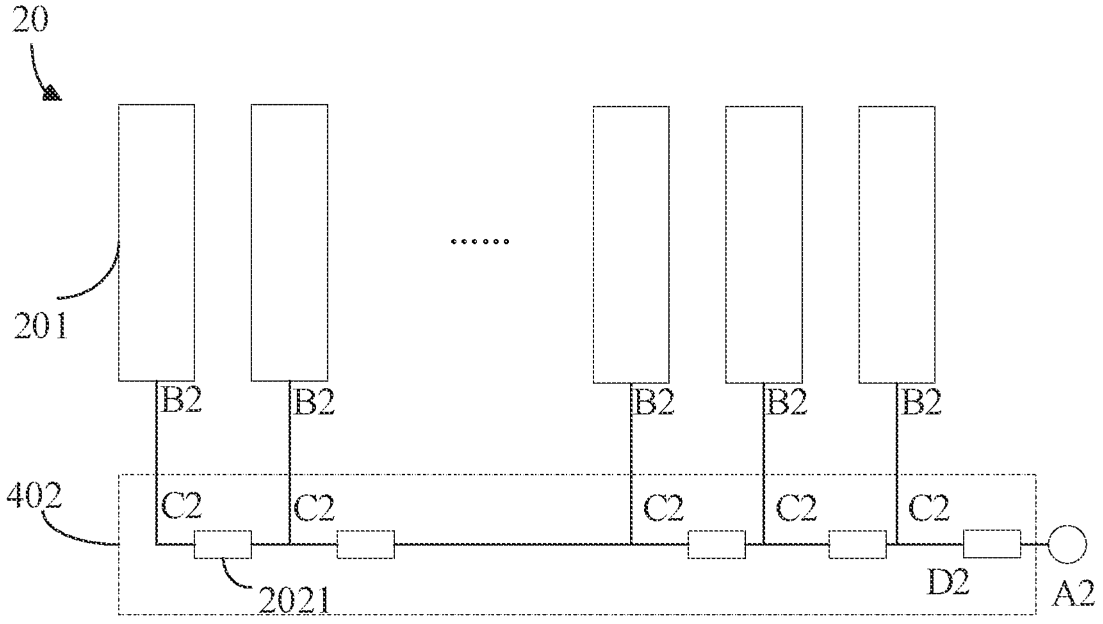
FIG. 6 is still another schematic structural diagram of a first circuit module in the drive circuit shown in FIG. 2.

Referring to FIG. 6, FIG. 6 is still another schematic structural diagram of a first circuit module in the drive circuit shown in FIG. 2. A first circuit module 402 shown in FIG. 6 differs from the first circuit module 202 shown in FIG. 3 in that in the first circuit module 402 shown in FIG. 6, on a series branch, a circuit unit 2021 is further arranged between a first end A2 and a first terminal D2.

Figure 7:
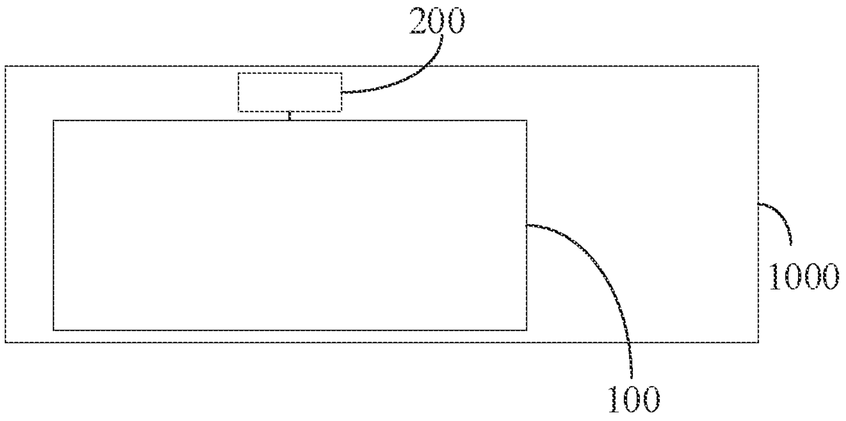
FIG. 7 is a schematic structural diagram of a display apparatus according to an embodiment of the present application.

Referring to FIG. 7, FIG. 7 is a schematic structural diagram of a display apparatus according to an embodiment of the present application. As shown in FIG. 7, the display apparatus 1000 according to the embodiment of the present application includes a display panel 100 and a driver chip 200 electrically connected to the display panel 100. The driver chip 200 includes the above-mentioned drive circuit 20.

Figure 8:
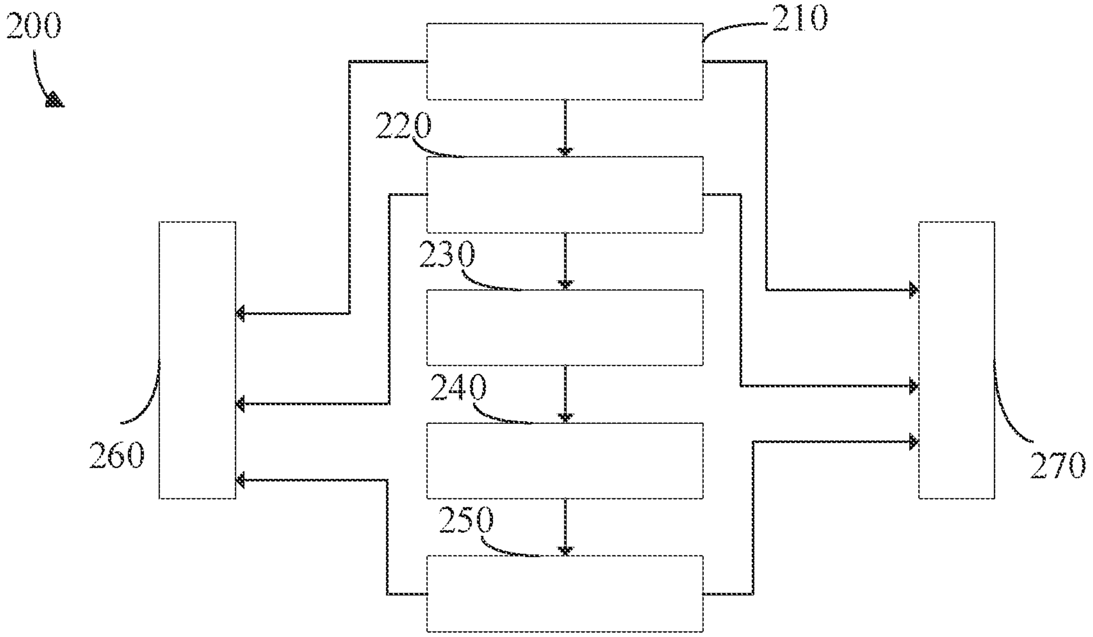
FIG. 8 is a schematic structural diagram of a driver chip according to an embodiment of the present application.

Specifically, referring to FIG. 8, FIG. 8 is a schematic structural diagram of a driver chip according to an embodiment of the present application. As shown in FIG. 8, the driver chip 200 includes a data receiving module 210, a logic control module 220, a shift register module 230, a data register module 240, a digital-to-analog conversion module 250, a first drive circuit 260 and a second drive circuit 270.

The data receiving module 210 is electrically connected to the logic control module 220, the first drive circuit 260 and the second drive circuit 270, the logic control module 220 is electrically connected to the shift register module 230, the first drive circuit 260 and the second drive circuit 270, the shift register module 230 is electrically connected to the data register module 240, the data register module 240 is electrically connected to the digital-to-analog conversion module 250, and the digital-to-analog conversion module 250 is electrically connected to the first drive circuit 260 and the second drive circuit 270. The data receiving module 210 is configured to receive a differential signal input from the front-end, decode the differential signal to obtain data information and a clock signal, and transmit the clock signal to the first drive circuit 260 and the second drive circuit 270. The logic control module 220 plays a role of logic control over functions of the entire chip, controls whether to enable a certain function, when to output a signal, etc., and transmits an output enable control signal to the first drive circuit 260 and the second drive circuit 270. The shift register module 230 converts serial data into parallel data and outputs the parallel data to the data register module 240. The digital-to-analog conversion module 250 converts a digital voltage into an analog voltage, and transmits a data voltage signal to the first drive circuit 260 and the second drive circuit 270.

The first drive circuit 260 and the second drive circuit 270 are the drive circuit 20 shown above. For details, reference may be made to the above-mentioned description. No repetition is made herein.

In the display apparatus according to the present application, a first circuit module is arranged in a chip, and the first circuit module is electrically connected to a first terminal and a plurality of second terminals, which can reduce alternating current power generated during transmission of a drive signal, thereby reducing a radiation intensity of an electromagnetic field.

The drive circuit and the display apparatus according to the embodiments of the present application have been described in detail above. Specific examples are applied herein to explain the principle and implementations of the present application, and the above-mentioned description of the embodiments is only intended to help understand the method and the core idea of the present application. In addition, for a person skilled in the art, there may be modifications in the specific implementations and application scope based on the idea of the present application. In conclusion, the content of the present specification should not be construed as a limitation to the present application.

What is claimed is:

1. A drive circuit, comprising:

a first terminal;

a plurality of second terminals;

a first circuit module electrically connected to the first terminal and the plurality of second terminals, wherein the first circuit module is configured to reduce alternating current power generated when a drive signal accessed by the first terminal is transmitted to the plurality of second terminals; and a plurality of second circuit modules, wherein the plurality of second circuit modules are one-to-one electrically connected to the plurality of second terminals, and the second circuit modules each are configured to output a data signal based on the drive signal, wherein the first circuit module comprises a plurality of circuit units, the circuit units each are configured to increase a drive current to enhance a driving capability of the drive signal, and the plurality of circuit units are arranged in series to form a series branch, wherein the series branch has a first end and a plurality of second ends, the first end and the plurality of second ends are arranged in sequence, the first end is electrically connected to the first terminal, and the plurality of second ends are one-to-one electrically connected to the plurality of second terminals.

2. The drive circuit according to claim 1, wherein the circuit units each comprise an operational amplifier, the operational amplifier has a positive terminal, a negative terminal, and an output terminal, the positive terminal is an input terminal of the circuit unit, and the negative terminal is electrically connected to the output terminal.

3. The drive circuit according to claim 1, wherein on the series branch, the number of the circuit units arranged between two adjacent second ends is equal.

4. The drive circuit according to claim 3, wherein on the series branch, one of the circuit units is arranged between two adjacent second ends.

5. The drive circuit according to claim 1, wherein on the series branch, a quantity of the circuit units arranged between two adjacent second ends increases in a direction from the first end to the plurality of second ends.

6. The drive circuit according to claim 1, wherein on the series branch, one of the circuit units is further arranged between the first end and the first terminal.

7. The drive circuit according to claim 1, wherein power $P_n$ is generated when the drive signal accessed by the first terminal is transmitted to the $n^{th}$ second terminal, $P_n=f_n*C_n*V^2$, wherein $C_n$ is a parasitic capacitance corresponding to the $n^{th}$ second terminal, $f_n$ is a charging and discharging frequency of the parasitic capacitance corresponding to the first second terminal to the parasitic capacitance corresponding to the $n^{th}$ second terminal; and Vis a voltage value of the drive signal.

8. The drive circuit according to claim 1, wherein the drive signal is a clock signal, an output enable control signal, or a data voltage signal.

9. A display apparatus, comprising a display panel and a driver chip electrically connected to the display panel, wherein the driver chip comprises a drive circuit, and the drive circuit comprises:

a first terminal;

a plurality of second terminals;

a first circuit module electrically connected to the first terminal and the plurality of second terminals, wherein the first circuit module is configured to reduce alternating current power generated when a drive signal accessed by the first terminal is transmitted to the plurality of second terminals; and a plurality of second circuit modules, wherein the plurality of second circuit modules are one-to-one electrically connected to the plurality of second terminals, and the second circuit modules each are configured to output a data signal based on the drive signal, wherein the first circuit module comprises a plurality of circuit units, the circuit units each are configured to increase a drive current to enhance a driving capability of the drive signal, and the plurality of circuit units are arranged in series to form a series branch, wherein the series branch has a first end and a plurality of second ends, the first end and the plurality of second ends are arranged in sequence, the first end is electrically connected to the first terminal, and the plurality of second ends are one-to-one electrically connected to the plurality of second terminals.

10. The display apparatus according to claim 9, wherein the circuit units each comprise an operational amplifier, the operational amplifier has a positive terminal, a negative terminal, and an output terminal, the positive terminal is an input terminal of the circuit unit, and the negative terminal is electrically connected to the output terminal.

11. The display apparatus according to claim 9, wherein on the series branch, the number of the circuit units arranged between two adjacent second ends is equal.

12. The display apparatus according to claim 11, wherein on the series branch, one of the circuit units is arranged between two adjacent second ends.

13. The display apparatus according to claim 9, wherein on the series branch, a quantity of the circuit units arranged between two adjacent second ends increases in a direction from the first end to the plurality of second ends.

14. The display apparatus according to claim 9, wherein on the series branch, one of the circuit units is further arranged between the first end and the first terminal.

15. The display apparatus according to claim 9, wherein power $P_n$ is generated when the drive signal accessed by the first terminal is transmitted to the $n^{th}$ second terminal, $P_n=f_n*C_n*V^2$, wherein $C_n$ is a parasitic capacitance corresponding to the $n^{th}$ second terminal, $f_n$ is a charging and discharging frequency of the parasitic capacitance corresponding to the first second terminal to the parasitic capacitance corresponding to the $n^{th}$ second terminal; and V is a voltage value of the drive signal.

16. The display apparatus according to claim 9, wherein the drive signal is a clock signal, an output enable control signal, or a data voltage signal.

* * * * *